(12) United States Patent
Ji

(10) Patent No.: US 12,405,118 B2
(45) Date of Patent: Sep. 2, 2025

(54) METHOD FOR GENERATING CIRCULAR TRAVELING ROUTE OF VEHICLE, DEVICE FOR GENERATING CIRCULAR TRAVELING ROUTE OF VEHICLE, AND RECORDING MEDIUM IN WHICH PROGRAM FOR EXECUTING METHOD FOR GENERATING CIRCULAR TRAVELING ROUTE OF VEHICLE IS RECORDED

(71) Applicant: 42DOT INC., Seoul (KR)

(72) Inventor: Seung Hyun Ji, Seoul (KR)

(73) Assignee: 42dot Inc., Seoul (KR)

( * ) Notice: Subject to any disclaimer, the term of this patent is extended or adjusted under 35 U.S.C. 154(b) by 144 days.

(21) Appl. No.: 18/259,409

(22) PCT Filed: Dec. 13, 2021

(86) PCT No.: PCT/KR2021/018854
§ 371 (c)(1),
(2) Date: Jun. 27, 2023

(87) PCT Pub. No.: WO2022/145804
PCT Pub. Date: Jul. 7, 2022

(65) Prior Publication Data
US 2024/0060783 A1 Feb. 22, 2024

(30) Foreign Application Priority Data
Dec. 29, 2020 (KR) .......................... 10-2020-0186329

(51) Int. Cl.
*G01C 21/34* (2006.01)

(52) U.S. Cl.
CPC ..... *G01C 21/3446* (2013.01); *G01C 21/3461* (2013.01); *G01C 21/3476* (2013.01)

(58) Field of Classification Search
CPC ............................ G01C 21/343; G06Q 10/047
See application file for complete search history.

(56) References Cited

U.S. PATENT DOCUMENTS

| 5,926,118 A | * | 7/1999 | Hayashida | ............. G01C 21/34 701/533 |
| 6,058,350 A | * | 5/2000 | Ihara | .................... G01C 21/387 701/93 |

(Continued)

FOREIGN PATENT DOCUMENTS

| JP | H10-103996 A | 4/1998 |
| JP | 2001-091284 A | 4/2001 |

(Continued)

OTHER PUBLICATIONS

Morgan (Year: 2008).*
International Search Report Dated Mar. 30, 2022.

*Primary Examiner* — Ryan Rink
(74) *Attorney, Agent, or Firm* — Harvest IP Law, LLP

(57) ABSTRACT

The method of generating a circular traveling route of a vehicle is performed by a route generation device, and the method comprises an operation of receiving a request for generating a circular traveling route including information about the list of roads to be circulated or information about an origin and a destination of the vehicle, an operation of grouping a list of roads to be circulated into a plurality of groups, and an operation of determining a vehicle traveling sequence in the plurality of groups.

4 Claims, 10 Drawing Sheets

(56) References Cited

U.S. PATENT DOCUMENTS

| | | | |
|---|---|---|---|
| 10,753,751 B2* | 8/2020 | Thompson | G06Q 10/04 |
| 2012/0310691 A1* | 12/2012 | Carlsson | G06Q 10/047 |
| | | | 705/7.13 |
| 2019/0390972 A1* | 12/2019 | Jiao | G01C 21/367 |
| 2022/0122004 A1* | 4/2022 | Takahara | G08G 1/202 |
| 2022/0137637 A1* | 5/2022 | Baldini | G01C 21/20 |
| | | | 701/25 |

FOREIGN PATENT DOCUMENTS

| | | |
|---|---|---|
| JP | 2004-245630 A | 9/2004 |
| JP | 2007-241340 A | 9/2007 |
| JP | 2015-38429 A | 2/2015 |
| JP | 2015-46186 A | 3/2015 |
| KR | 10-0266036 B1 | 6/2000 |
| KR | 10-2013-0029637 A | 3/2013 |
| KR | 10-2021-0046896 A | 4/2021 |
| KR | 10-2307506 B1 | 9/2021 |
| KR | 10-2310417 B1 | 10/2021 |

* cited by examiner

METHOD FOR GENERATING CIRCULAR TRAVELING ROUTE OF VEHICLE, DEVICE FOR GENERATING CIRCULAR TRAVELING ROUTE OF VEHICLE, AND RECORDING MEDIUM IN WHICH PROGRAM FOR EXECUTING METHOD FOR GENERATING CIRCULAR TRAVELING ROUTE OF VEHICLE IS RECORDED

CROSS REFERENCE TO RELATED APPLICATION(S)

This application is a National Stage of International Application No. PCT/KR2021/018854 filed on Dec. 13, 2021, claiming priority based on Korean Patent Application No. 10-2020-0186329 filed on Dec. 29, 2020, the disclosure of which is incorporated herein by reference in its entirety.

TECHNICAL FIELD

The present disclosure relates to a method of generating a circular traveling route of a vehicle, a device for generating a circular traveling route of a vehicle, and a recording medium in which a program for executing the method of generating a circular traveling route of a vehicle is recorded, and more particularly, to a method of generating a circular traveling route of a vehicle, a device for generating a circular traveling route of a vehicle, and a recording medium in which a program for executing the method of generating a circular traveling route of a vehicle is recorded, capable of efficiently generating an optimal circular traveling route for a vehicle, which needs to travel through the entire list of predetermined roads for a specific purpose, such as building a road map, obtaining image data, or performing road maintenance work, generating an optimal circular traveling route for a vehicle, which needs to repeatedly travel a list of predetermined roads a certain number of times depending on the purpose of vehicle travel, generating an optimal circular traveling route in consideration of a travel cost calculated according to various travel cost calculation criteria, such as a travel distance, a travel time, and the like, selected by a driver, and grouping a list of roads on the basis of information about a preferred traveling direction selected by a driver to generate an optimal circular traveling route that meets the purpose of vehicle travel.

BACKGROUND ART

In order to provide traveling routes for data collection vehicles that need to travel a specific road section to build road maps or obtain image data, or maintenance vehicles that perform road maintenance works such as cleaning and snow removal on a specific road section, it is necessary to provide the traveling routes that pass through the entire list of roads along which these vehicles must travel for their works.

Meanwhile, according to the related art, in order to search for traveling routes that pass through the entire list of, for example, 10,000 roads, it is necessary to search for an optimal route in a state in which all the 10,000 roads are input as waypoint information, which requires significant calculation time to optimize a sequence of traveling waypoints.

Specifically, the calculation for optimizing the sequence of traveling waypoints is a non-deterministic polynomial time problem (NP-Problem), and thus, the number of all cases should be calculated to calculate the optimal travel sequence, which is practically impossible.

Accordingly, a heuristic method (Traveling Salesperson Problem (TSP) Solver Algorithm) may be proposed to optimize the sequence of traveling waypoints, but this method also has a limitation in that it takes too much time to optimize the sequence of waypoints depending on the number of the waypoints.

In addition, the data collection vehicles that need to travel a specific road section to build road maps or obtain image data may need to travel the specific road section repeatedly for a predetermined required number of times, and the related art has a limitation of not being able to support the generation of a route that allows the vehicle to travel the same waypoint twice or more.

In addition, the related art has a limitation of not being able to support the generation of a traveling route that meets various purposes of driving a vehicle, such as building road maps, obtaining image data, or maintaining roads.

Specifically, when a vehicle travels for the purpose of obtaining image data, the vehicle should travel in a straight forward direction as much as possible, minimizing turning movements such as right, left, and U-turns to obtain high-quality data, but the conventional simple waypoint method has a technical limitation that it is not possible to generate a traveling route in consideration of such preferred traveling directions.

DESCRIPTION OF EMBODIMENTS

Technical Problem

Accordingly, an objective of the present disclosure is to provide a method of generating a circular traveling route of a vehicle, a device for generating a circular traveling route of a vehicle, and a recording medium in which a program for executing the method of generating a circular traveling route of a vehicle is recorded, enabling an optimal circular traveling route for a vehicle, which needs to travel through the entire list of predetermined roads for a specific purpose, such as building a road map, obtaining image data, or performing road maintenance work, to be efficiently generated.

In addition, another objective of the present disclosure is to provide a method of generating a circular traveling route of a vehicle, a device for generating a circular traveling route of a vehicle, and a recording medium in which a program for executing the method of generating a circular traveling route of a vehicle is recorded, enabling an optimal circular traveling route for a vehicle, which needs to repeatedly travel a list of predetermined roads a certain number of times depending on the purpose of vehicle travel, to be generated.

In addition, another objective of the present disclosure is to provide a method of generating a circular traveling route of a vehicle, a device for generating a circular traveling route of a vehicle, and a recording medium in which a program for executing the method of generating a circular traveling route of a vehicle is recorded, enabling an optimal circular traveling route to be generated in consideration of a travel cost calculated according to various travel cost calculation criteria such as a travel distance and a travel time selected by a driver.

In addition, another objective of the present disclosure is to provide a method of generating a circular traveling route of a vehicle, a device for generating a circular traveling route of a vehicle, and a recording medium in which a program for executing the method of generating a circular traveling route of a vehicle is recorded, enabling a list of roads to be grouped based on information about a preferred traveling direction selected by a driver to generate an optimal circular traveling route that meets the purpose of vehicle travel.

Technical Solution to Problem

In order to achieve the above objects, a method of generating a circular traveling route of a vehicle according to the present disclosure includes an operation (a) of grouping a list of roads to be circulated into a plurality of groups by a route generation device, and an operation (b) of determining a vehicle traveling sequence in the plurality of groups by the route generation device.

Preferably, the method further includes, before the operation (a), receiving a request for generating a circular traveling route including information about the list of roads to be circulated or information about an origin and a destination of the vehicle, by the route generation device.

In addition, the operation (a) includes an operation (a1) of primarily grouping the list of roads to be circulated on the basis of information about branch points of the roads to be circulated, by the route generation device, and an operation (a2) of secondarily grouping the list of the primarily grouped groups on the basis of information about a preferred traveling direction at a road branch point, by the route generation device.

In addition, the operation (b) includes an operation (b1) of calculating a travel cost required for traveling from an exit point of a first group among the plurality of groups to an entry point of a second group among the plurality of groups, by the route generation device, and an operation (b1) of determining a vehicle traveling sequence in the plurality of groups on the basis of the calculated travel cost, by the route generation device.

In addition, the travel cost may be calculated on the basis of at least one of a travel time required for traveling from the exit point of the first group to the entry point of the second group, a travel distance required for traveling from the exit point of the first group to the entry point of the second group, and information about a turning travel in a process of traveling from the exit point of the first group to the entry point of the second group.

In addition, the method further includes an operation (c) of generating the circular traveling route of the vehicle on the basis of a vehicle traveling sequence in the determined plurality of groups, the information about the number of repeated travels on the roads to be circulated, and the information about the travelable time of the vehicle, by the route generation device.

Meanwhile, a route generation device includes a calculation unit configured to group a list of roads to be circulated into a plurality of groups, and determine a vehicle traveling sequence in the plurality of groups.

Preferably, the route generation device further includes a reception unit configured to receive a request for generating a circular traveling route including information about the list of roads to be circulated or information about an origin and a destination of the vehicle.

In addition, the calculation unit primarily groups the list of roads to be circulated on the basis of information about branch points of the roads to be circulated, and secondarily groups the list of the primarily grouped groups on the basis of information about a preferred traveling direction at a road branch point.

In addition, the calculation unit calculates a travel cost required for traveling from an exit point of a first group among the plurality of groups to an entry point of a second group among the plurality of groups, and determines a vehicle traveling sequence in the plurality of groups on the basis of the calculated travel cost.

In addition, the travel cost may be calculated on the basis of at least one of a travel time required for traveling from the exit point of the first group to the entry point of the second group, a travel distance required for traveling from the exit point of the first group to the entry point of the second group, and information about a turning travel in a process of traveling from the exit point of the first group to the entry point of the second group.

In addition, the calculation unit generates the circular traveling route of a vehicle on the basis of a vehicle traveling sequence in the determined plurality of groups, the information about the number of repeated travels on the roads to be circulated, and the information about the travelable time of the vehicle.

Meanwhile, a recording medium according to the present disclosure records a program for executing the method.

Advantageous Effects of Disclosure

According to the present disclosure, an optimal circular traveling route for a vehicle, which needs to travel through the entire list of predetermined roads for a specific purpose, such as building a road map, obtaining image data, or performing road maintenance work, can be efficiently generated.

In addition, according to the present disclosure, an optimal circular traveling route for a vehicle, which needs to repeatedly travel a list of predetermined roads a certain number of times depending on the purpose of vehicle travel, can be generated.

In addition, according to the present disclosure, an optimal circular traveling route can be generated in consideration of a travel cost calculated according to various travel cost calculation criteria such as a travel distance and a travel time selected by a driver.

In addition, according to the present disclosure, a list of roads can be grouped based on information on a preferred traveling direction selected by a driver to generate an optimal circular traveling route that meets the purpose of vehicle travel.

MODE OF DISCLOSURE

Figure 1:
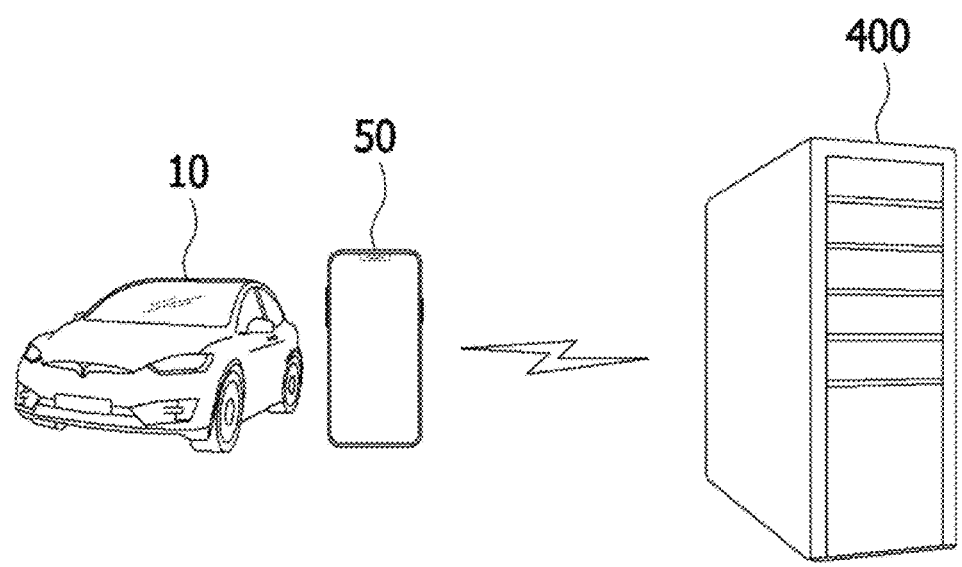
FIG. 1 is a configuration diagram of a system for generating a circular traveling route of a vehicle according to an embodiment of the present disclosure.

Hereinafter, the present disclosure will be described in more detail with reference to the drawings. It should be noted that the same components in the drawings are denoted by the same reference numerals wherever possible. In addition, when it is determined that detailed descriptions of related well-known functions and configurations unnecessarily obscure the gist of the present disclosure, the detailed descriptions thereof will be omitted.

FIG. 1 is a configuration diagram of a system for generating a circular traveling route of a vehicle according to an embodiment of the present disclosure. Referring to FIG. 1, a system for generating a circular traveling route of a vehicle according to an embodiment of the present disclosure includes a vehicle terminal 50 and a route generation device 400.

The vehicle terminal 50 may be a navigation terminal, which is installed in a vehicle 10 traveling a circular traveling route of a vehicle generated by a route generation device 400, or a smart phone carried by a vehicle driver, and the vehicle terminal 50 transmits a request for generating a circular traveling route to the route generation device 400 according to the operation of the driver.

Meanwhile, in practicing the present disclosure, the request for generating a circular traveling route transmitted from the vehicle terminal 50 to the route generation device 400 may include information about an origin of the vehicle 10, information about a destination of the vehicle 10, information about a list of roads to be circulated, information about the number of repeated travels on the roads to be circulated, information about a preferred traveling direction at a road branch point, and information about a travelable time of the vehicle 10.

In addition, in practicing the present disclosure, an application program, such as a navigation program that is necessary to use a service for generating and providing a circular traveling route of a vehicle according to the present disclosure, may be installed on the vehicle terminal 50.

The route generation device 400 is a device for executing a method of generating a circular traveling route of a vehicle according to an embodiment of the present disclosure, and in practicing the present disclosure, the route generation device 400 may also be a service providing server that provides a service for generating and providing a circular traveling route of a vehicle by generating the circular traveling route of a vehicle in response to a request for generating a circular traveling route from the vehicle terminal 50 and transmitting the generated circular traveling route to the vehicle terminal 50.

Specifically, the route generation device 400 generates an optimal circular traveling route for the vehicle 10 that needs to repeatedly travel a specific road section a certain number of times in order to build a road map or obtain image data, or for the vehicle 10 for maintenance that performs road maintenance works such as cleaning, snow removal, and the like on a specific road section.

To this end, the route generation device 400 groups the list of roads to be circulated into a plurality of groups, determines a vehicle traveling sequence between the plurality of groups, and generates a circular traveling route of a vehicle on the basis of the determined vehicle traveling sequence.

Meanwhile, in practicing the present disclosure, the route generation device 400 may also provide a conventional navigation service for guiding a traveling route of a vehicle in response to a driver's request.

Figure 2:
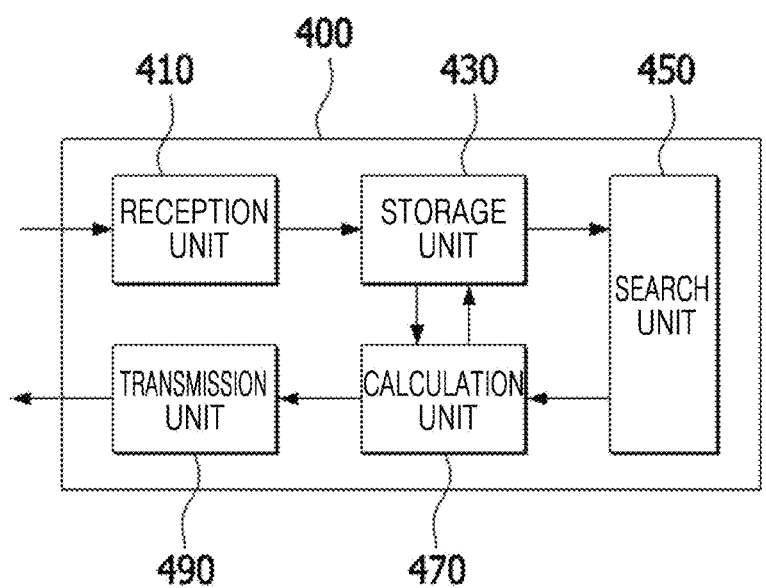
FIG. 2 is a functional block diagram illustrating a structure of the route generation device according to an embodiment of the present disclosure.

FIG. 2 is a functional block diagram illustrating a structure of the route generation device 400 according to an embodiment of the present disclosure. Referring to FIG. 2, the route generation device 400 according to an embodiment of the present disclosure includes a reception unit 410, a storage unit 430, a search unit 450, a calculation unit 470, and a transmission unit 490.

The reception unit 410 of the route generation device 400 receives a request for generating a circular traveling route including information about an origin of the vehicle 10, information about a destination of the vehicle 10, information about a list of roads to be circulated, information about the number of repeated travels on the roads to be circulated, information about a preferred traveling direction at a road branch point, and information about a travelable time of the vehicle 10, from the vehicle terminal 50.

The storage unit 430 of the route generation device 400 stores road network data including each list of roads in a region for which a service for generating a circular traveling route of a vehicle according to the present disclosure is provided, and the search unit 450 searches the information about the list of roads to be circulated received from the vehicle terminal 50 from the road network data stored in the storage unit 430.

The calculation unit 470 of the route generation device 400 groups the list of roads to be circulated into a plurality of groups, determines a vehicle traveling sequence in the plurality of groups, and generates a circular traveling route of a vehicle on the basis of the determined vehicle traveling sequence.

Meanwhile, the transmission unit 490 of the route generation device 400 transmits the circular traveling route of a vehicle generated by the calculation unit 470 to the vehicle terminal 50.

Figure 3:
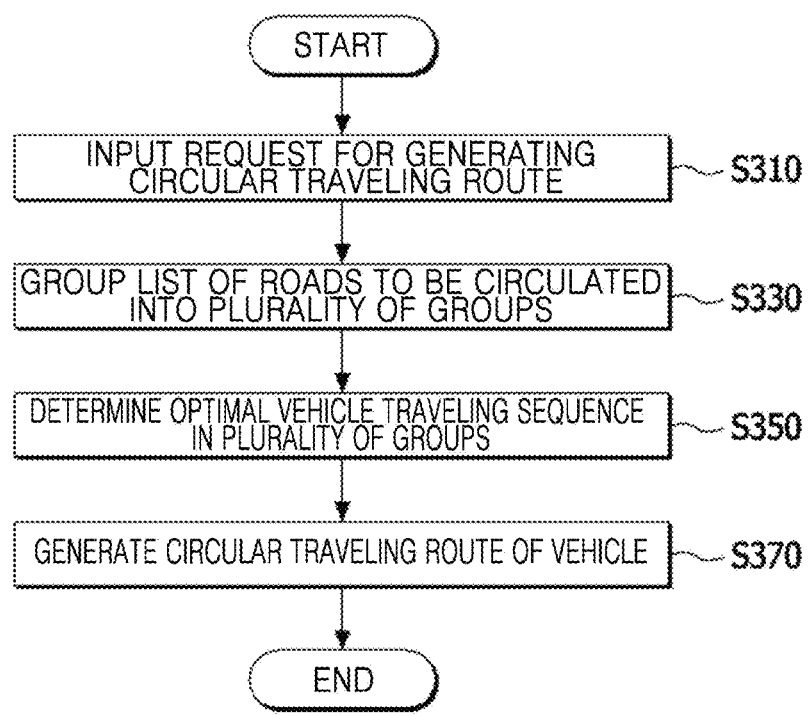
FIG. 3 is a flowchart illustrating an execution process of a method of generating a circular traveling route of a vehicle according to an embodiment of the present disclosure.

FIG. 3 is a flowchart illustrating an execution process of the method of generating a circular traveling route of a vehicle according to an embodiment of the present disclosure. Hereinafter, the execution process of the method of generating a circular traveling route of a vehicle according to an embodiment of the present disclosure will be described with reference to FIGS. 1 to 3.

First, a request for generating a circular traveling route from a vehicle driver is input through the reception unit 410 of the route generation device 400 (S310). Specifically, as the driver executes an application program such as a navigation program installed in the vehicle terminal 50, and then inputs information about an origin of the vehicle 10, information about a destination of the vehicle 10, information about a list of roads to be circulated, information about the number of repeated travels on the roads to be circulated, information about a preferred traveling direction at a road branch point, and information about a travelable time of the vehicle 10, the vehicle terminal 50 transmits the request for generating a circular traveling route including the input information to the route generation device 400.

Meanwhile, in practicing the present disclosure, when the driver does not directly input origin information, information about a current location of the vehicle 10 measured by a global position system (GPS) module provided in the vehicle terminal 50 may be automatically input as the origin information.

Thus, the reception unit 410 of the route generation device 400 receives the request for generating a circular traveling route from the vehicle terminal 50, and the calculation unit 470 of the route generation device 400 groups the list of roads to be circulated included in the request for generating a circular traveling route into a plurality of groups (S330).

Figure 4:
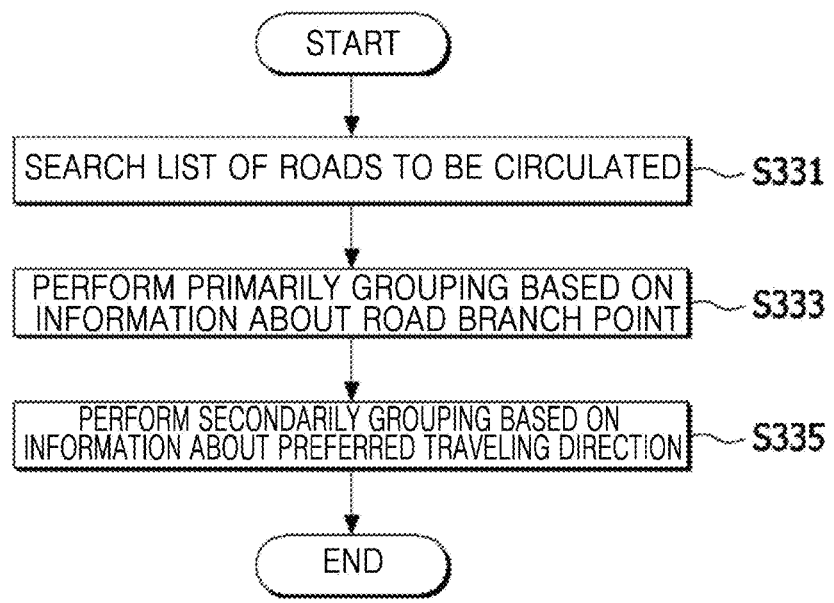
FIG. 4 is a flowchart illustrating a grouping process of a list of roads to be circulated in the execution process of the method of generating a circular traveling route of a vehicle according to an embodiment of the present disclosure.

FIG. 4 is a flowchart illustrating a grouping process of a list of roads to be circulated in the execution process of the method of generating a circular traveling route of a vehicle according to an embodiment of the present disclosure.

Figure 6:
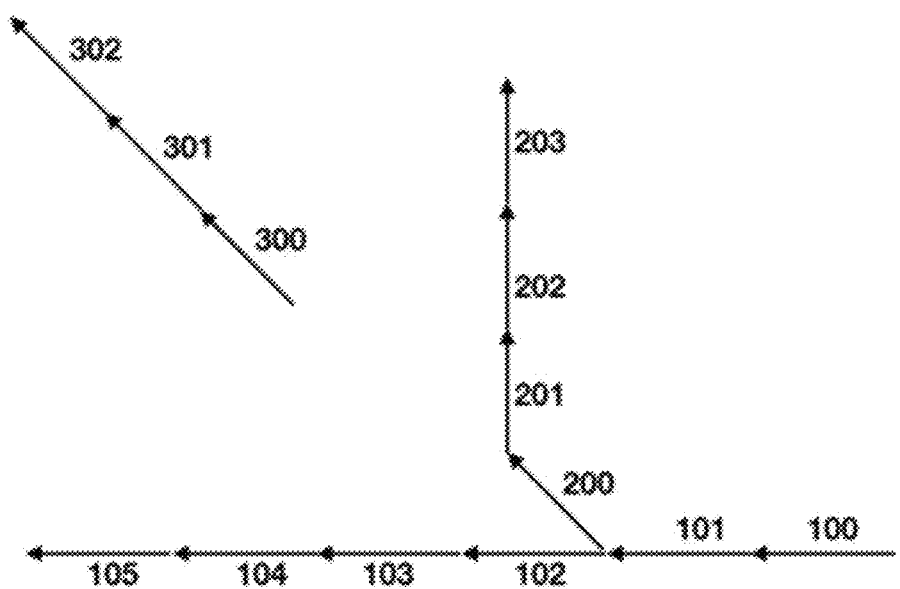
FIGS. 6 to 8 are views illustrating a grouping process of a list of roads in the execution process of the method of generating a circular traveling route of a vehicle according to an embodiment of the present disclosure.

When the route generation device 400 groups a list of roads to be circulated into a plurality of groups, the search unit 450 of the route generation device 400 searches information about a list of roads (100, 101, . . . , 105, 200, 201, . . . , 203, 300, 301, and 302) to be circulated, which is included in the request for generating a circular traveling route, from the road network data stored in the storage unit 430, and as a result, the search result as shown in FIG. 6 is provided (S331).

Meanwhile, in practicing the present disclosure, when the request for generating a circular traveling route does not include the information about the list of roads to be circulated, the search unit 450 of the route generation device 400 may also search the entire list of roads of a certain class (e.g., a general national road) or higher within a predetermined radius (e.g., 5 km) from each point constituting a traveling route from an origin to a destination through road network data on the basis of the origin and destination information of the vehicle 10 included in the request for generating a circular traveling route and generate the searched list of roads as the list of roads to be circulated.

Figure 7:
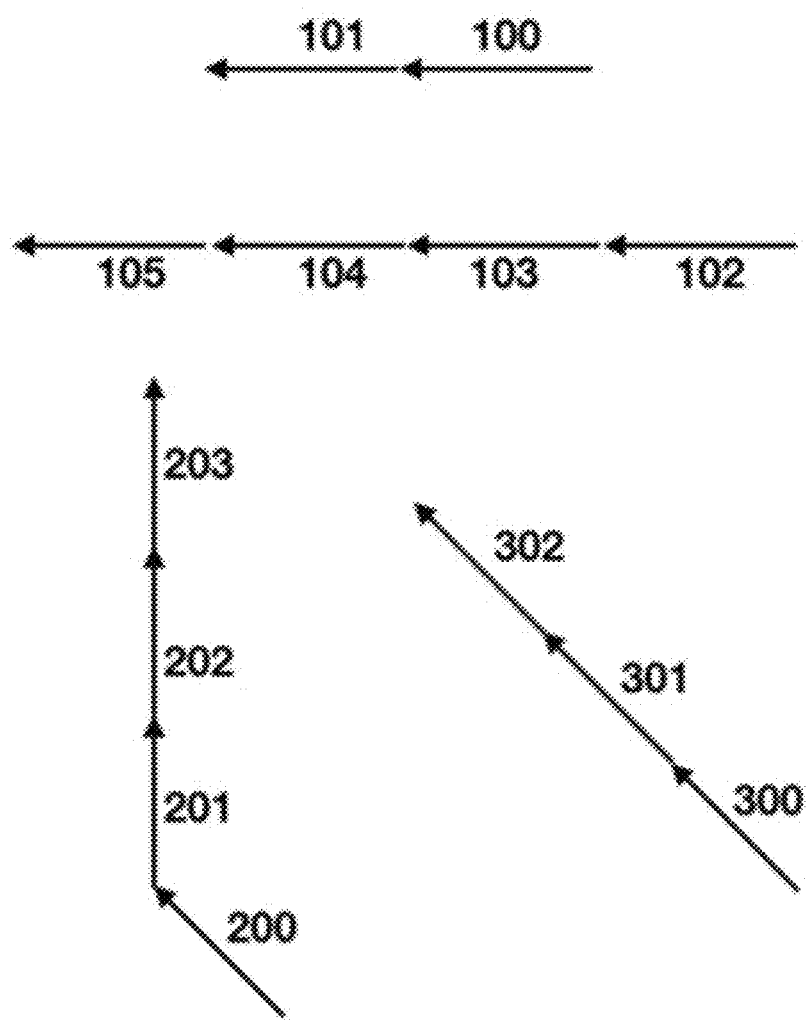

Thereafter, as shown in FIG. 7, the calculation unit 470 of the route generation device 400 primarily groups the list of roads to be circulated on the basis of information about branch points of the roads to be circulated identified as shown in FIG. 6 (S333).

Specifically, the calculation unit 470 of the route generation device 400 performs primarily grouping the list of roads into a plurality of groups by grouping the roads, which are continuously connected to each other in a forward direction, from the list of roads in the road network data into a single group, but grouping only the roads to be circulated before a branch point into a single group and grouping the roads to be circulated after the branch point into a new group.

Thereafter, the calculation unit 470 of the route generation device 400 secondarily groups the plurality of groups, which are primarily grouped, on the basis of the information about the preferred traveling direction at the road branch point, which is input in operation S310 described above (S335).

That is, the calculation unit 470 of the route generation device 400 performs the secondarily grouping process for the plurality of groups, which are primarily grouped, by determining a traveling direction (i.e., a direction at the secondarily grouping) at the branch point of the roads to be circulated according to the information about the preferred traveling direction selected by the driver.

Specifically, when the information about the preferred traveling direction at the road branch point, which is input in operation S310 described above, indicates "straight forward", the calculation unit 470 of the route generation device 400 performs the secondarily grouping process for the roads 100, . . . , and 105 by grouping a first section of roads 100 and 101 together with a second section of roads 102, . . . , and 105 among the second section of roads 102, . . . , and 105 and a third section of roads 200, . . . , and 203, which can be secondarily grouped together with the first section of roads 100 and 101 by being connected to the primarily grouped first section of roads 100 and 101.

For reference, when the vehicle 10 travels to collect image data on a road, in operation S310 described above, it is preferable that the driver selects and inputs the information about the preferred traveling direction as "straight forward" in operation S310 to minimize distortion of the image data.

When the information about the preferred traveling direction at the road branch point, which is input in operation S310 described above, indicates "right turn", the calculation unit 470 of the route generation device 400 performs the secondarily grouping process by grouping the third section of roads 200, . . . , and 203 together with the first section of roads 100 and 101.

As described above, in the present disclosure, the route generation device 400 is able to generate the circular traveling route of a vehicle that meets the purpose of vehicle operation by grouping the list of roads on the basis of the information about the preferred traveling direction according to the purpose of vehicle operation.

Meanwhile, in practicing the present disclosure, the information about the preferred traveling direction at the road branch point may not be included in the request for generating a circular traveling route in operation S310 described above, and in this case, as described above, the calculation unit 470 of the route generation device 400 may perform the secondarily grouping process on the basis of information about a preferred traveling direction at a road branch point, which is set by default.

Figure 8:
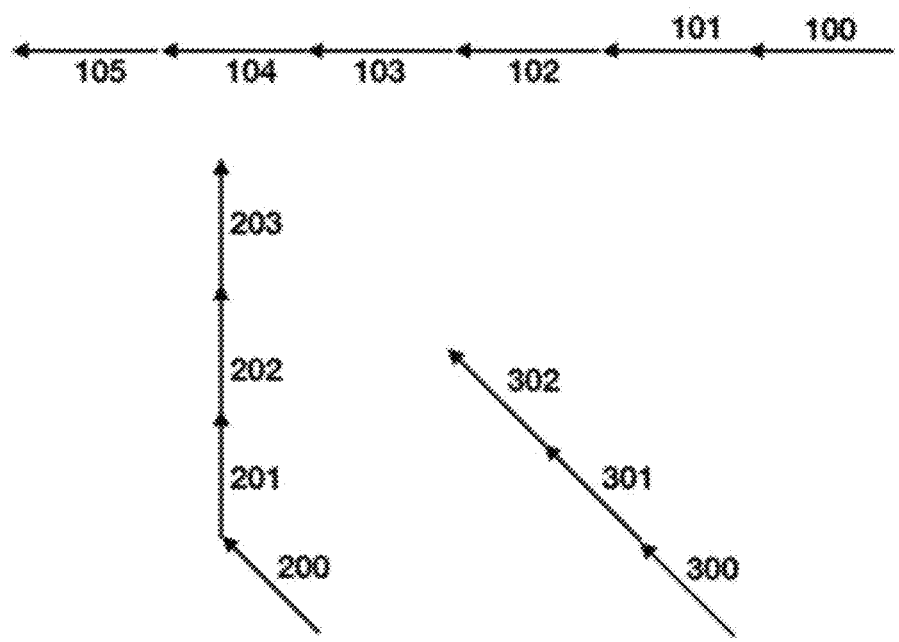

Through the above-described secondarily grouping process, a final grouping of the list of roads to be circulated is completed, and as shown in FIG. 8, the calculation unit 470 of the route generation device 400 determines an optimal vehicle traveling sequence between the plurality of groups that are finally grouped (S350).

Figure 5:
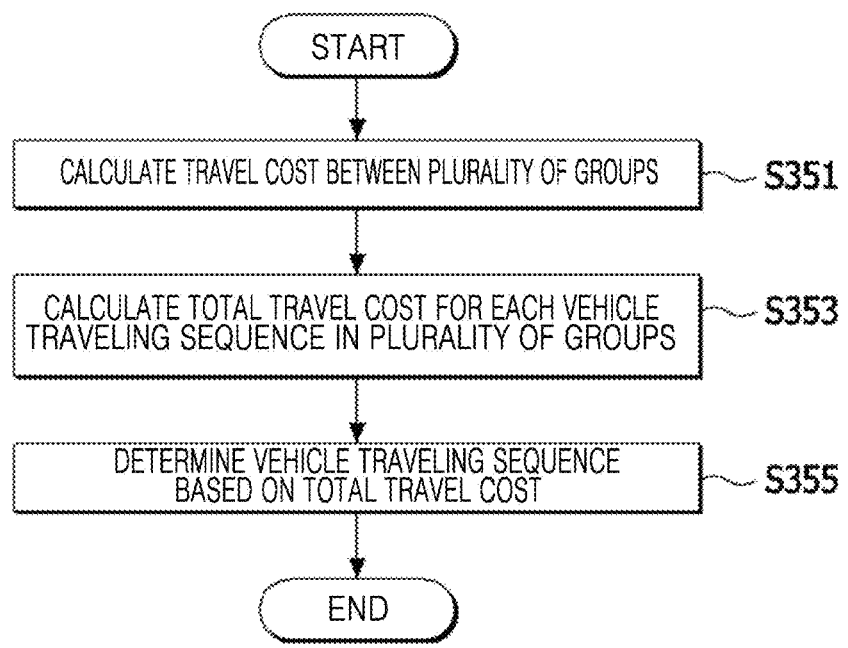
FIG. 5 is a flowchart illustrating a determining process of a vehicle traveling sequence in the execution process of the method of generating a circular traveling route of a vehicle according to an embodiment of the present disclosure.

FIG. 5 is a flowchart illustrating a determining process of a vehicle traveling sequence in the execution process of the method of generating a circular traveling route of a vehicle according to an embodiment of the present disclosure.

For example, in order to determine an optimal vehicle traveling sequence from the three groups that are finally grouped as shown in FIG. 8, the search unit 450 of the route generation device 400 searches for an entry point and an exit point of each group from the road network data, and the calculation unit 470 of the route generation device 400 may calculate an intergroup travel cost for traveling from the exit point of any one of the plurality of groups to the entry point of another group of the plurality of groups as shown in Table 1 below (S351).

TABLE 1

| Exit point | Entry point | Travel cost |
| --- | --- | --- |
| First group | First group | a |
|  | Second group | b |
|  | Third group | c |
| Second group | First group | d |
|  | Second group | e |
|  | Third group | f |
| Third group | First group | g |
|  | Second group | h |
|  | Third group | i |

In practicing the present disclosure, the intergroup travel cost shown in Table 1 may be an intergroup travel distance or an intergroup travel time, and may also be a score that quantifies a travel burden degree due to a right turn, a left turn, a U-turn, or the like while intergroup traveling.

Meanwhile, in practicing the present disclosure, the request for generating a circular traveling route in operation S310 described above may include information about a driver's selection for an intergroup travel cost calculation criterion (at least one of a travel distance, a travel time, and a travel burden degree), and thus, the calculation unit 470 of the route generation device 400 may calculate the intergroup travel cost shown in Table 1 according to the intergroup travel cost calculation criterion selected by the driver.

As described above, according to the present disclosure, it is possible to generate the circular traveling route of a vehicle on the basis of the travel cost calculated according to the travel cost calculation criterion such as a travel distance, a travel time, or the like selected by the driver according to the purpose of vehicle operation.

Specifically, the calculation unit 470 of the route generation device 400 may calculate a total intergroup travel cost in completing one circular travel between a total of three groups as shown in Table 2 below (S353).

TABLE 2

| Intergroup travel sequence | Total travel cost |
| --- | --- |
| 1→2→3→1 | b + f + g |
| 1→3→2→1 | c + h + a |
| 2→1→3→2 | d + c + h |
| 2→3→1→2 | f + g + b |
| 3→1→2→3 | g + b + f |
| 3→2→1→3 | h + d + c |

Accordingly, the calculation unit 470 of the route generation device 400 may determine an intergroup travel order corresponding to the total travel cost having the smallest magnitude among the total travel costs calculated as shown in Table 2 as the vehicle traveling sequence in the plurality of groups (S355).

Meanwhile, the calculation unit 470 of the route generation device 400 generates a circular traveling route of a vehicle on the basis of the vehicle traveling sequence in the plurality of groups determined as above, and transmits the generated circular traveling route to the vehicle terminal 50 (S370).

Specifically, the calculation unit 470 of the route generation device 400 may generate a repetitive circular traveling route of the vehicle 10 according to the vehicle traveling sequence (e.g., 3→1→2→3) in the plurality of groups determined in Table 2 described above until the number of times (e.g., 3) that the vehicle 10 repeatedly travels the roads to be circulated included in the request for generating a circular traveling route in operation S310 described above.

Meanwhile, in practicing the present disclosure, the request for generating a circular traveling route in operation S310 described above may not include information about the number of times that the vehicle 10 repeatedly travels the roads to be circulated, and in this case, the calculation unit 470 of the route generation device 400 may generate the repetitive circular traveling route of the vehicle 10 as described above based on repeated travel number information that is set by default.

In addition, in practicing the present disclosure, the calculation unit 470 of the route generation device 400 generates the repetitive circular traveling route of the vehicle 10 according to the vehicle traveling sequence (e.g., 3→1→2→3) in the plurality of groups determined through Table 2 described above, and simultaneously, may calculate a total travel time required for the vehicle 10 to travel the generated circular traveling route to be included the travel time in each group, determine whether the total travel time thus calculated exceeds a travelable time of the vehicle 10 included in the request for generating a circular traveling route in operation S310 described above, and stop the further generation of the repetitive circular traveling route for the vehicle 10 when the total travel time thus calculated exceeds the travelable time of the vehicle 10.

Meanwhile, in practicing the present disclosure, in operation S310 described above, the driver may directly input information about the travelable time (e.g., 2 hours) of the vehicle 10 according to the personal situation to the vehicle terminal 50, but information about a travelable time of the vehicle 10 calculated by an application program installed in the vehicle terminal 50 on the basis of remaining fuel information of the vehicle 10 received from a control device of the vehicle 10 may be automatically input as the information about the travelable time.

In addition, in practicing the present disclosure, the calculation unit 470 of the route generation device 400 generates the repetitive circular traveling route of the vehicle 10 according to the vehicle traveling sequence (e.g., 3→1→2→3) in the plurality of groups determined through Table 2 described above, and simultaneously, may calculate a travel distance according to the generated circular traveling route, determine whether the travel distance thus calculated exceeds a travelable distance of the vehicle 10 included in the request for generating a circular traveling route in operation S310 described above, and stop the further generation of the repetitive circular traveling route for the vehicle 10 when the travel distance thus calculated exceeds the travelable distance of the vehicle 10.

To this end, in operation S310 described above, the driver may additionally input, to the vehicle terminal 50, travelable distance information displayed on an instrument panel of the vehicle 10 according to a level of remaining fuel of the vehicle 10, or travelable distance information calculated by an application program installed in the vehicle terminal 50 on the basis of remaining fuel information of the vehicle 10 received from the control device of the vehicle 10 may be automatically included in the request for generating a circular traveling route in operation S310 described above.

Figure 9:
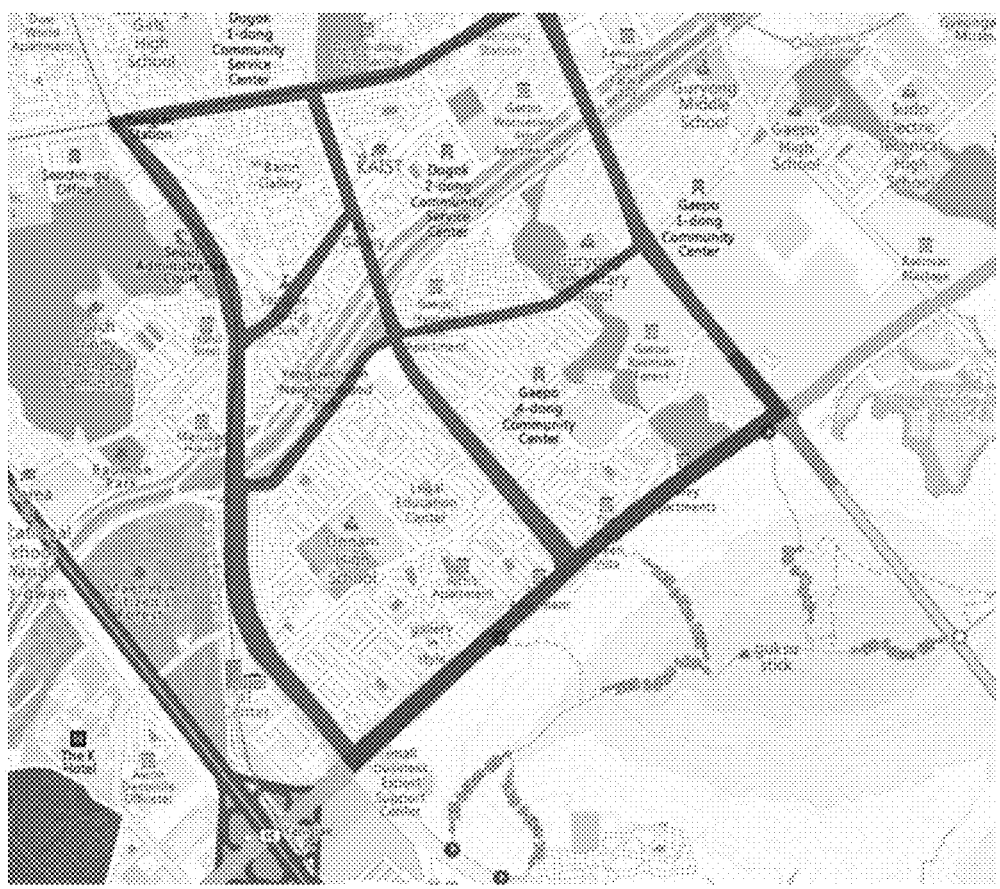
FIG. 9 is a view illustrating a circular traveling route of a vehicle generated by the method of generating a circular traveling route of a vehicle according to an embodiment of the present disclosure.

Accordingly, the route generation device 400 transmits the circular traveling route of a vehicle generated as shown in FIG. 9 to the vehicle terminal 50 so that the vehicle driver can drive the vehicle 10 according to the circular traveling route of the vehicle provided from the route generation device 400.

As described above, according to the present disclosure, by grouping a list of roads to be circulated, it is possible to efficiently generate an optimal circular traveling route for a vehicle that needs to travel through the entire list of predetermined roads for building a road map, obtaining image data, performing road maintenance works, or the like.

Figure 10:
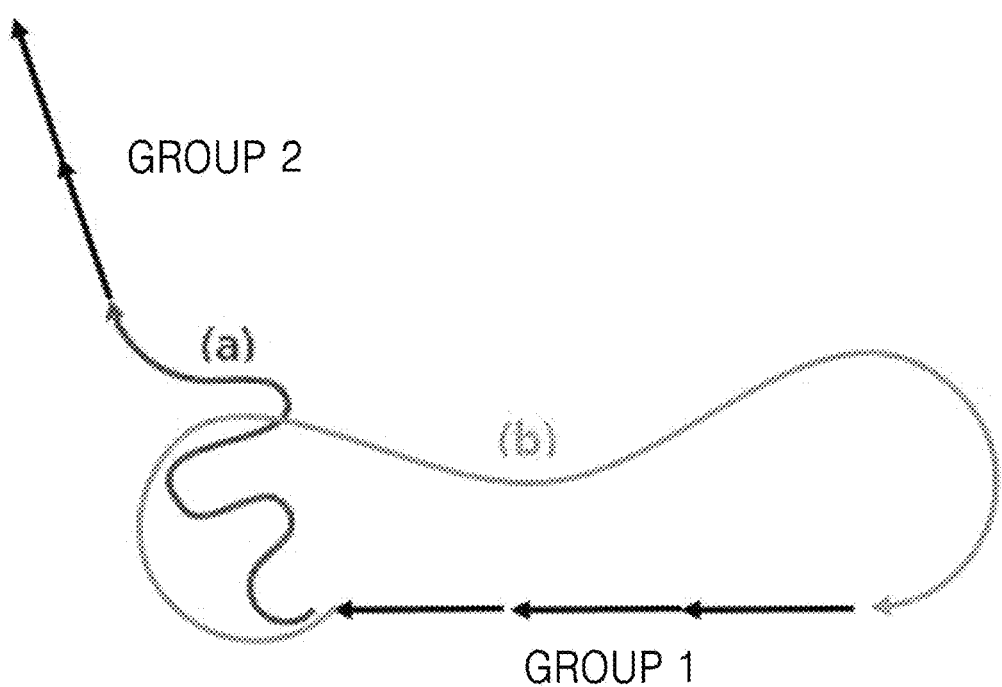
FIG. 10 is a view illustrating the principle of calculating an intergroup travel cost for a list of roads in the execution process of the method of generating a circular traveling route of a vehicle according to an embodiment of the present disclosure.

Meanwhile, according to the present disclosure, by calculating the intergroup travel cost as shown in Table 1 in a state in which the list of roads to be circulated is grouped as described above, a travel cost a (see (b) of FIG. 10) from the exit point of the first group to the entry point of the first group as well as a travel cost b (see (a) of FIG. 10) from the exit point of the first group to the entry point of the second group can be calculated, so that it is possible to generate a circular traveling route for a vehicle that needs to repeatedly travel the road section corresponding to the first group.

In addition, in practicing the present disclosure, the vehicle 10 may be allowed to enter the circular traveling route by searching, from the road network data, the list of roads that are at the closest distance from the origin information input by the driver in operation S310 described above from among each list of roads constituting the circular traveling route of the vehicle, generating a traveling route to the list of roads with the closest distance from the origin of the vehicle 10, and then transmitting the traveling route to the vehicle terminal 50 first, before the route generation device 400 transmits the generated circular traveling route to the vehicle terminal 50.

In addition, in practicing the present disclosure, when the travel of the vehicle along the circular traveling route is completed, the route generation device 400 may further guide the travel of the vehicle 10 to a destination (e.g., home) for the vehicle 10 that has completed the circulated travel, by generating a traveling route from a position of the vehicle at the completion of the travel to the destination input by the driver in operation S310 described above and then transmitting the traveling route to the vehicle terminal 50.

Meanwhile, in practicing the present disclosure, a program for executing the method of generating a circular traveling route of a vehicle according to the present disclosure may be installed in the vehicle circular traveling route generation device 400 according to the present disclosure, may be recorded on various computer-readable recording media, or may be stored in a server that transmits the corresponding program via a network.

Terms used in the present disclosure are used to describe specified embodiments and are not intended to limit the present disclosure. Singular forms are intended to include plural forms as well, unless the context clearly indicates otherwise. In the present application, it will be further understood that the terms "comprise", "comprising", "include", and/or "including", when used in this specification, specify the presence of stated features, integers, steps, operations, elements, components and/or groups thereof but do not preclude the presence or addition of one or more other features, integers, steps, operations, elements, components and/or groups thereof.

While exemplary embodiments and applications of the present disclosure have been illustrated and described, the present disclosure is not to be construed as limited to the particular embodiments and applications described above, and it will be understood that various modifications may be made without departing from the spirit and scope of the present disclosure and such modifications are not individually understandable from the present disclosure.

EXPLANATION OF REFERENCE NUMERALS DESIGNATING THE MAJOR ELEMENTS OF THE DRAWINGS

10: vehicle, 50: vehicle terminal
400: route generation device

The invention claimed is:

1. A method of generating a circular traveling route of a vehicle, the method comprising:
an operation (a) of receiving a request for generating a circular traveling route including information about the list of roads to be circulated or information about an origin and a destination of the vehicle, by a route generation device,
an operation (b) of grouping a list of roads to be circulated into a plurality of groups by the route generation device; and
an operation (c) of determining a vehicle traveling sequence in the plurality of groups by the route generation device, and
wherein the request for generating the circular traveling route further includes information about a number of repeated travels on the roads to be circulated and information about a travelable time of the vehicle, and
wherein the circular traveling route is generated on the basis of the number of repeated travels and the travelable time of the vehicle.

2. The method of claim 1, wherein
the operation (b) includes:
an operation (b1) of primarily grouping the list of roads to be circulated on the basis of information about branch points of the roads to be circulated, by the route generation device; and
an operation (b2) of secondarily grouping the list of the primarily grouped groups on the basis of information about a preferred traveling direction at a road branch point, by the route generation device.

3. The method of claim 1, wherein
the operation (c) includes:
an operation (c1) of calculating a travel cost required for traveling from an exit point of a first group among the plurality of groups to an entry point of a second group among the plurality of groups, by the route generation device; and
an operation (c1) of determining a vehicle traveling sequence in the plurality of groups on the basis of the calculated travel cost, by the route generation device.

4. A non-transitory recording medium in which a program for executing the method in claim 1 is recorded.

* * * * *